PREPARATION OF ALIPHATIC DINITRILES BY AMMOXIDATION OF HYDROCARBONS

This invention relates to a process for the preparation of aliphatic dinitriles and especially to the preparation of adiponitrile, by the ammoxidation of hydrocarbons.

Cyclohexane may be converted to aliphatic dinitriles, especially adiponitrile, by ammoxidation. This may be accomplished by contacting a gaseous mixture containing cyclohexane or cyclohexane, oxygen and ammonia, with a solid catalyst containing antimony or molybdenum and oxygen at an elevated temperature.

We have now found that when methylcyclohexane is subjected to such a reaction, adiponitrile is produced, the methyl group of the methyl cyclohexane being removed during the reaction.

Accordingly, we provide a process for the preparation of aliphatic dinitriles which comprises contacting a gaseous mixture comprising methylcyclohexane, ammonia and oxygen with a solid catalyst comprising a compound of antimony or molybdenum and oxygen at an elevated temperature. The temperature of reaction is generally from 300° to 700° C., and preferably from 350° to 550° C.

Both cyclohexane and methylcyclohexane may be prepared from toluene, a common constituent of the aromatic fraction produced by the reforming of petroleum feedstocks and at present a large proportion of the toluene so obtained is de-alkylated to benzene, from which the bulk of cyclohexane is produced by hydrogenation. However, methyl cyclohexane may be produced directly by hydrogenation of toluene, and by the use of the process of our present invention, de-alkylation of methylcylohexane takes place simultaneously with ammoxidation, thus obviating the need for a separated de-alkylation stage with resulting reduction in the cost of the ammoxidation starting material.

The antimony/oxygen and molybdenum/oxygen catalysts for use in our process may be prepared as described herein and the reaction may be carried out with or without the addition of halogen at the catalyst surface. Similar process conditions may be used, the product containing a mixture of adiponitrile, glutaronitrile and succinonitrile which may be separated as previously described.

The process of our invention is illustrated by the following Examples:

CATALYST PREPARATION (1) Antimony/Tin Oxide Catalyst 334.2 g. of $SnCl_4.5H_2O$ were dissolved at room temperature in 500 mls. of 1 percent HCl solution to form drop-wise colorless solution. This solution and 250 mls. (575 g.) of $SbCl_5$ were added drop-wise to 2 liters of cold distilled water, whilst vigorously stirring the water. A solid precipitate formed and HCl fumes were evolved. The temperature of the aqueous mixture rose to about 60° C. When the addition of the two solutions was complete the mixtures were cooled with stirring to room temperature. Concentrated ammonia (specific gravity 0.88) was then added to the aqueous mixture, whilst stirring vigorously, to adjust the pH. to about 5. In the course of the additions of the ammonia, the mixture became hot, reaching a temperature of about 60° C. The resultant mixture was then cooled, whilst stirring slowly, to room temperature, and filtered under suction to separate the fine white precipitate. The catalytic properties of the eventual combined oxides were found to be impaired by digesting the acidic liquor containing the precipitated oxides at an elevated temperature (e.g. 96° C.) before the ammonia addition but subsequent filtration is facilitated by such digestion. The precipitate was washed with cold distilled water (10×200 mls.) dried at 150° C. for 12 hours, heated at 380° C. for 4 hours, and finally heated at 550° C. for 18 hours. The resulting greenish brown solid, containing 46.28 percent by weight Sb and 25.71 percent by weight Sn, was ground tp between 10 and 30 mesh B.S.S. and mixed with twice its own weight of silica chips of the same particle size. The mixture was used as catalyst in the appropriate examples.

(2) MOLYBDENUM TRIOXIDE CATALYST

Molybdic acid (200 g.) was roasted in a stream of air at 550° C. for 20 hours. The resulting oxide was ground to between 10 and 30 mesh B.S.S. and was mixed with twice its own weight of silica chips of the same particle size. This mixture was used as catalyst in the appropriate example.

(3) MOLYBDENUM PHOSPHATE CATALYST

Ammonium phospho molybdate (300 g.) was roasted in a stream of air at 600° C. to 650° C. for 24 hours. The resulting molybdenum phosphate was ground to between 10 and 30 mesh B.S.S. and was mixed with twice its own weight of silica chips of the same particle size. This mixture was used as catalyst in the appropriate example.

(4) COBALT MOLYBDATE CATALYST

Cobalt nitrate (29 g.) was dissolved in 60 ml. of water and ammonium molybdate (123 g.) was dissolved in 100 ml. of water. The resulting solutions were mixed at 60° C. with stirring. Ammonia (S.G.0.880) was added to the mixture until its pH. was 6.7. It was then cooled and filtered. The precipitate was washed thoroughly with water (10×200 ml.), dried at 120° C. and finally calcined at 650° C. for 16 hours. The resulting cobalt molybdate was ground to between 10 and 30 mesh B.S.S. and mixed with twice its own weight of silica chips of the same particle size. This mixture was used as catalyst in the appropriate example.

AMMOXIDATION PROCEDURE

A feed gas was made up by mixing streams of methylcyclohexane, ammonia, air, and nitrogen. The rate of flow of feed through the catalyst-containing reactor was 9 to 18 liters per hour and the catalyst volume was about 10 mls., giving contact times in the range 1.0 to 4.0 secs. The appropriate gas feed composition and contact time is stated in each example.

The components of the feed gas were supplied to a mixing vessel, comprising a glass bulb packed with glass helices and maintained at a temperature of 100° C., via separate rotary flow meters. From the mixing vessel the gas stream was passed to the reactor vessel which incorporated a preheater section containing silica chips (10 to 30 mesh B.S.S.) at reaction temperature, and following thereon, a principal section containing the ammoxidation catalyst.

The effluent from the reactor was passed into a cold trap immersed in a solid carbon dioxide/methanol mixture. The liquid condensation product was analyzed by gas/liquid chromatography.

In the following examples, "conversion" means that proportion of the hydrocarbon feed which has reacted, and "selectivity" means that proportion of reacted hydrocarbon feed which has formed the appropriate dinitrile.

EXAMPLE 1

Using the general procedure given above, methylcyclohexane was ammoxidised using an antimony/tin oxide catalyst (prepared as detailed under (1) above) without added halogen.

| Gas feed compositions: (By volume) | | |
|---|---|---|
| | Methylcyclohexane | 3.0% |
| | Oxygen | 12.0% |
| | Nitrogen | 79.0% |
| | Ammonia | 6.0% |
| Mean contact time: 1.1 secs. | | |
| Temperature: 430° C. | | |

The product in this and subsequent examples contained a mixture of adiponitrile (ADN), glutaronitrile (GN) and succinonitrile (SN). Analysis of the product gave rise to the following results:

| Conversion of methylcyclohexane | | 18.5% |
|---|---|---|
| Selectivity with respect to | ADN | 22.7% |
| | GN | 10.2% |
| | SN | 4.4% |

United States Patent

[11] 3,624,125

| [72] | Inventors | Clive Barnett;<br>John Dewing; Anthony Howden Jubb, all of Runcorn, England |
|---|---|---|
| [21] | Appl. No. | 770,827 |
| [22] | Filed | Oct. 25, 1968 |
| [45] | Patented | Nov. 30, 1971 |
| [73] | Assignee | Imperial Chemical Industries Limited<br>London, England |
| [32] | Priority | Nov. 6, 1967 |
| [33] | | Great Britain |
| [31] | | 50,336/67 |

[54] PREPARATION OF ALIPHATIC DINITRILES BY AMMOXIDATION OF HYDROCARBONS
5 Claims, No Drawings

[52] U.S. Cl. .................................................. 260/465.3,
 260/465.8 R
[51] Int. Cl. .................................................. C07c 121/02
[50] Field of Search .......................................... 260/465.3

[56] References Cited
UNITED STATES PATENTS

| 3,152,170 | 10/1964 | Barclay et al. | 260/465.3 |
| 3,153,085 | 10/1964 | Hadley | 260/465.3 |
| 3,269,957 | 8/1966 | Bethell | 260/465.3 |
| 3,433,823 | 3/1969 | McMahon | 260/465.3 |

OTHER REFERENCES

Mekhtiev, et al. (I), C.A., Vol. 64 (1966), p-8100
Mekhtiev, et al. (II), C.A., Vol. 64 (1966) p-12596
Mekhtiev, et al. (III), C.A., Vol. 65 (1966) p-3787

*Primary Examiner*—Joseph P. Brust
*Attorney*—Cushman, Darby and Cushman

ABSTRACT: A process for the preparation of aliphatic dinitriles, particularly adiponitrile, by reacting methylcyclohexane with ammonia and oxygen over an antimony or molybdenum oxide catalyst, optionally in the presence of halogen at the catalyst surface.